United States Patent
Singhal (10) Patent No.: US 6,370,527 B1
(45) Date of Patent: Apr. 9, 2002

(54) METHOD AND APPARATUS FOR SEARCHING DISTRIBUTED NETWORKS USING A PLURALITY OF SEARCH DEVICES

(75) Inventor: Amitabh Kumar Singhal, Basking Ridge, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/222,129

(22) Filed: Dec. 29, 1998

(51) Int. Cl.[7] .............................................. G06F 17/30
(52) U.S. Cl. .............................................. 707/6; 707/7
(58) Field of Search ........................................ 707/1–7

(56) References Cited

U.S. PATENT DOCUMENTS

| | | | | |
|---|---|---|---|---|
| 5,748,954 A | * | 5/1998 | Mauldin ........................ | 707/10 |
| 5,826,260 A | * | 10/1998 | Byrd, Jr. et al. ................ | 707/5 |
| 5,864,846 A | * | 1/1999 | Voorhees et al. ............... | 707/5 |
| 5,873,081 A | * | 2/1999 | Harel ............................. | 707/3 |
| 5,920,854 A | * | 7/1999 | Kirsch et al. ................... | 707/3 |
| 5,924,090 A | * | 7/1999 | Krellenstein ................... | 707/5 |
| 5,987,446 A | * | 11/1999 | Corey et al. ................... | 707/3 |
| 6,012,053 A | * | 1/2000 | Pant et al. ..................... | 707/3 |
| 6,067,539 A | * | 5/2000 | Cohen ............................ | 707/2 |
| 6,070,158 A | * | 5/2000 | Kirsch et al. ................... | 707/3 |
| 6,078,914 A | * | 6/2000 | Redfern .......................... | 707/3 |
| 6,085,186 A | * | 7/2000 | Christianson et al. .......... | 707/3 |
| 6,101,491 A | * | 8/2000 | Woods ........................... | 707/3 |
| 6,169,986 B1 | * | 1/2001 | Bowman et al. ............... | 707/5 |
| 6,185,558 B1 | * | 2/2001 | Bowman et al. ............... | 707/5 |
| 6,269,361 B1 | * | 7/2001 | Davis et al. .................... | 707/3 |
| 6,275,820 B1 | * | 8/2001 | Navin-Chandra et al. ...... | 707/3 |
| 6,282,538 B1 | * | 8/2001 | Woods ........................... | 707/5 |

OTHER PUBLICATIONS

Sample of All4One search results, no date.
Sample of MetaCrawler search results, no date.

* cited by examiner

Primary Examiner—Thomas Black
Assistant Examiner—Mary Wang
(74) Attorney, Agent, or Firm—Oliff & Berridge, PLC (57) ABSTRACT

A meta-search engine apparatus and method for searching distributed networks using a plurality of search devices. The meta-search engine apparatus sends search queries to a plurality of search engines and compiles the results obtained from each of these search engines into a single ranked list. The results obtained from each of the search engines includes a listing of the titles of found sources of the search terms, or related search terms, and a summary of the source. The compilation and ranking is based primarily on the occurrence of search terms, or related search terms, in the titles and summaries but may also be based on, for example, relative weights given to each search engine, the number of search engines returning the same source as a result of a search, weighting of sections of the results obtained from the search engines, and the like.

16 Claims, 6 Drawing Sheets

FIG. 1 PRIOR ART

[GO2NET]

[Personal] [Net Search]

DriveSavers Data Recovery → Click Here Now! ←

MetaCrawlor

The Go2Net Network information retrieval Go
Query: information retrieval
Collated Results: I to 20 of 42 references.
Result pages: 1- 2 - 3 next For Premium Research Solutions, Try Electric Library

Win a custom 1999 Beetle from Cars.com! Click to enter.

1000 Welcome to CNIDR
*Excite, WebCrawler*: Center for Networked Information Discovery and Retrieval
What's New? Try the new user interface to our patent search systems Our Information Retrieval resources: Isite, Isearch, and more...
http://cnidr.org/welcome.html (Excite WebCrawler)

For information YOUR TOWN, click here!

739 Welcome to CNIDR
*Infoseek*: w e l c o m e ! The Center for Networked Information Discovery and Retrieval at MCNC is a leader in the design and implementation of distributed information management systems. Its projects have ranged from custom turnkey information systems to state-of-the-art research in Internet data management and retrieval. Designers of the next ....
*Thunderstone*: Coorperative Agreement with the National Science Foundation. Partnerships with other organizations are also an opportunity for exchanging knowledge and software, or for combining technologies to build proof-of-concept
http://www.cnidr.org/ (Infoseek Thunderstone)

682 NSSDC OMNIWeb
*Excite, WebCrawkr*: OMNDWeb is a WWW-based data retrieval and analysis interface to NSSDC's OMNI data which consist of 1-hour-resolution "near-Earth" solar wind magnetic field and plasma data, energetic proton fluxes ( 1-60 MeV), and geomagnetic and solar activity indices.
http://nssdc.gsfc.nasagov/omniweb/ow.html (Excite WebCrawler)

557 Florida Agricultural Information Retrieval System (FAIRS)
Infoseek: Latest Mediterranean Fruit Fly Information -- New material added May 1st, 1998 TomatoYellow Leaf Curl Virus We are updating our PDF files. For best results, download the free version of Adobe ....
Yahoo!: - institute of food and agricultural sciences at the University of Florida
http://hammock.ifas.ufl.edu/ (Infoseek Yahoo!)

534 Automated Information Retrieval Systems (AIRS)
-source of foreclosure information covering Dallas, Denton, Collin, Rockwall and Tarrant counties.
http://www.re-airs.com/ (Yahoo!)

| | |
|---|---|
| 10 | GARDEN TOOLS WHOLESALE MARKET<br>AN ON-LINE SITE WHERE GARDENING ENTHUSIASTS CAN PURCHASE AND SELL GARDEN TOOLS, PART FOR GARDEN TOOLS MAY BE ORDERED, AND REVIEWS OF NEW GARDEN TOOLS ARE AVAILABLE |
| 8 | GARDEN ENTHUSIASTS<br>A SITE FOR THOSE WHO LOVE TO GARDEN. REVIEWS OF NEW GARDEN TOOLS. ADVERTISEMENTS FOR GARDEN SUPPLIES AND TOOLS. TIPS ON HOW TO HAVE A PERFECT GARDEN. |
| 5 | BACKYARD DESIGNS<br>LEARN HOW TO CREATE THE PERFECT GARDEN. EXPERTS TELL YOU WHAT TOOLS TO BUY AND PROVIDE THEIR FAVORITE GARDEN DESIGNS. PICTURES OF FAMOUS GARDENS AND GARDENS OF THE RICH AND FAMOUS. |

METHOD AND APPARATUS FOR SEARCHING DISTRIBUTED NETWORKS USING A PLURALITY OF SEARCH DEVICES

BACKGROUND OF THE INVENTION

1. Field of Invention

The present invention is directed to a method and apparatus for searching distributed networks using a plurality of search devices.

2. Description of Related Art

With increased use of the Internet and other similar distributed networks, the ability to search these networks to locate information and files is becoming increasingly important. Currently, with the Internet, for example, the network is searched with the aid of search engines. The search engines allow a user to enter a search query, comprised of search terms, and the search engine searches the various devices connected to the network for the occurrence of these search terms in documents and files located on the devices.

Each search engine, however, only covers a small portion of the distributed network. Thus, in order to be assured that the user has located all the sources of the search terms, available by any search engine, within the distributed network, the search query must be repeatedly entered into a number of different search engines to locate all devices having information or files containing the search terms. Thus, there is a need for new technology to allow a user to search all of the available portions of a distributed network without having to repeatedly reenter their search query.

SUMMARY OF THE INVENTION

The present invention is directed to a method and apparatus for searching distributed networks using a plurality of search devices. The apparatus includes a meta-search engine device that receives a search query from a user device. The meta-search engine device submits the search query to a plurality of search engine devices and compiles the results from each of the search engine devices into a merged list. The merged list is then sorted and ranked according to predetermined criteria and displayed to the user via the user device.

The ranking of the list may be based on, for example, the presence of the search terms, or terms related to the search terms, in a summary and/or title of the retrieved sources, rankings obtained from the various search engine devices, weighting factors based on the particular search engine devices from which the search results are retrieved, the number of repetitions, if any, of retrieved sources, and the like.

Thus, with the present invention, a user is able to search a distributed network with a plurality of search devices and thus is more assured that all locations containing information or files related to his/her search query have been found. Furthermore, the user is provided with a compiled listing with a single ranking scheme to thereby determine which of the many retrieved search locations are the most relevant to the search query. Additionally, the single ranked list returned to the user is ranked primarily by the occurrence of search terms, or terms related to the search terms, in the title and summary of the sources and thus is more representative of the relative importance of the sources than prior art meta or single rank search devices.

BRIEF DESCRIPTION OF THE DRAWINGS

The preferred embodiments of the present invention will be described with reference to the following drawings, wherein like numerals designate like elements, and wherein:

FIG. 1 is an example of a first type of meta-search engine;

DETAILED DESCRIPTION OF PREFERRED EMBODIMENTS

Meta-search engines have been developed to alleviate manually repeating the entry of search queries into a number of different search engines by automatically entering the search terms into a plurality of search engines. FIG. 1 shows an example of one type of meta-search engine called MetaCrawler, located on the Internet at www.metacrawler.com. The results obtained from the plurality of search engines are received by the meta-search engine and either returned as separate lists of found sources or are compiled into a list usually ranked by the number of search engines that found the same source. In the first case, the user must parse through each list to identify sources of interest. In the second case, the ranked list does not provide a true representation of the relative importance of each source since the ranked list is skewed by the size of the portion and the particular sources included in the portion of the network that each search engine covers.

Figure 2:
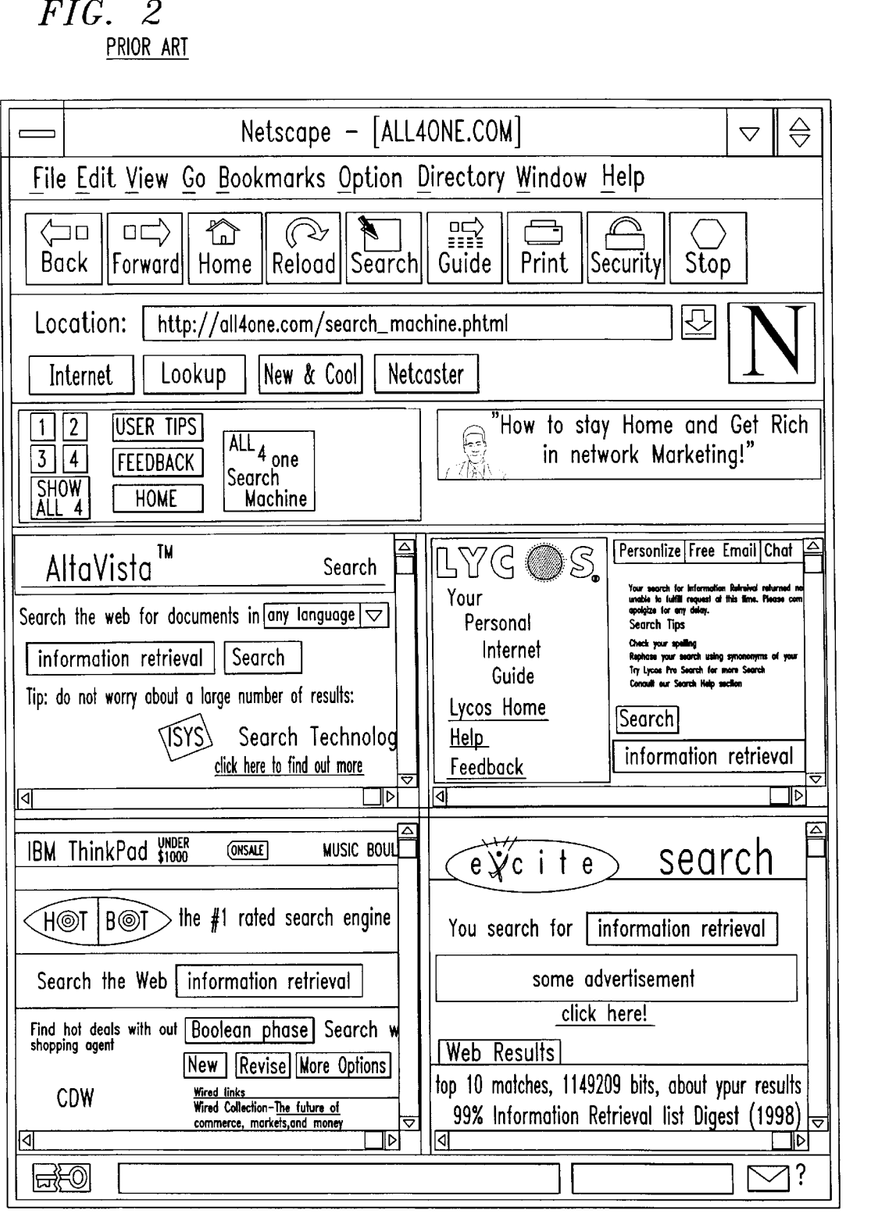
FIG. 2 is an example of a second type of meta-search engine.

FIG. 2 is an example of a meta-search engine All4One, located on the Internet at www.all4one.com, which returns multiple lists of found sources to the user. As shown in FIG. 2, each individual window of the display represents a particular search engine. The meta-search engine merely allows the simultaneous entry of a search query into each of the search engines and simultaneous display of search results.

With the present invention, a meta-search engine device sends search queries to a plurality of search engines and compiles the results obtained from each of these search engines into a single ranked list. The results obtained from each of the search engines includes a listing of the titles of found sources of the search terms, or terms related to the search terms, or a summary of each source, or both titles and a summary of each source. The compilation and ranking is based primarily on the occurrence of the search terms, or terms related to the search terms, in the titles and/or summaries but may also be based on, for example, relative weights given to each search engine, the number of search engines returning the same source as a result of a search, weighting of sections of the results obtained from the search engines, and any other weighting factor readily apparent to one of ordinary skill in the art.

Figure 3:
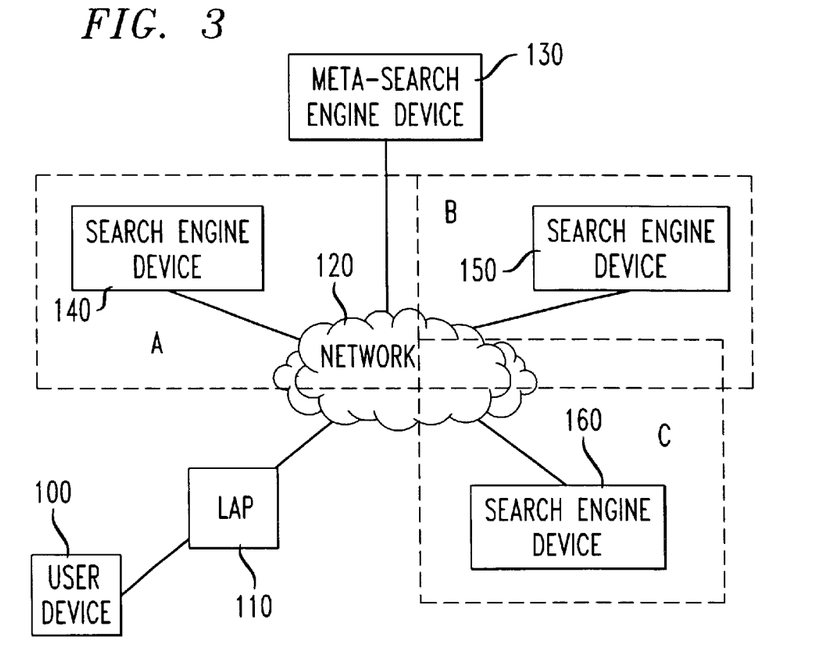
FIG. 3 is a block diagram of a system employing the present invention.

FIG. 3 is a block diagram of a system employing the present invention. The system includes a user device 100, local access provider (LAP) 110, network 120, a meta-search engine device 130, and search engine devices 140–160. The user device 100 sends communication signals to the meta-search engine device 130 via the LAP 110 and the network 120.

The user device 100 is any type device that is capable of sending and receiving communication signals. For example, the user device 100 may be a computer, a terminal, a telephone, WebTV™, a personal digital assistant (PDA), and the like. For simplicity of the following description of the preferred embodiments, it is assumed that the user device 100 is a personal computer. The user device 100 sends and receives communication signals to and from the network 120 via the LAP 110.

The LAP 110 is any type device that provides communication access to the network 120. For example, the LAP 110 may be an Internet service provider (ISP), a network server, a local exchange carrier (LEC), and the like. The user device 100 may "log-onto" the LAP 110 in order to gain access to the network 120 by, for example, dialing an access number of the LAP 1 10 and entering a user ID and/or password.

The network 120 may be any type network that is capable of sending and receiving communication signals. For example, the network 120 may be a data network, such as the Internet, an intranet, a local area network (LAN), a wide area network (WAN), and the like. The network 120 may also be a telecommunications network, such as a local telephone network, long distance telephone network, cellular telephone network, satellite communications network, and the like. Furthermore, the network 120 may include more than one network and may include a plurality of different types of networks. Thus, the network 120 may include a plurality of data networks, a plurality of telecommunications networks, a combination of data and telecommunications networks, and the like.

The network 120 may include a plurality of storage devices (not shown) which store information and files that may be of interest to a user of the user device 100. The information and files stored on these storage devices may be located by using any one or more of the search engine devices 140–160 connected to the network 120. These search engine devices 140–160 provide search capabilities for searching portions of the network 120 (represented by dashed lines). Thus, each search engine device 140–160 is capable of searching certain ones of the plurality of storage devices storing information and files of possible interest. Thus, search engine device 140 may search a first portion A of the network 120, search engine 150 a second portion B, and search engine 160 a third portion C. These portions may overlap and thus two or more search engine devices 140–160 may be capable of searching some of the same storage devices.

A meta-search engine device 130 is connected to the network 120. The meta-search engine device 130 allows a user to enter, via their user device 100, a search query which is then used in each of the plurality of search engine devices 140–160 to search for information and files on the storage devices 140–160 that contain the search query terms, or terms related to the search query terms.

Related search query terms may be determined by each of the individual search engine devices 140–160 when the search query is sent to the search engine devices 140–160. Alternatively, the meta-search engine device 130 may include an association generator (not shown) that generates a listing of the terms associated with the search terms. When the search query is sent to the search engine devices 140–160, the search query may be modified to include these related terms obtained from the association generator. Thus, for example, if a user were to enter a search term "house," the related search query terms that may be used by either the search engine devices 140–160 or retrieved from the association generator would include "apartment," "residence," "domicile," and the like.

The meta-search engine device 130 compiles the search results from the plurality of search engine devices 140–160 and ranks the search results according to predetermined criteria. The ranked listing of search results is then sent, over the network 120 and through the LAP 110, to the user device 100 for use by the user.

The ranked listing of the present invention provides a single ranking scheme that is readily understandable by a user. Furthermore, the user is not required to physically enter their search terms into each available search engine devices 140–160 and sort through the multiple listings of retrieved locations. Additionally, the ranked listing is more representative of the actual relative importance of found sources. The term "source" as used in this disclosure includes any file, document, web page, distributed network location, and the like containing the search terms, or terms related to the search terms, entered by a user into the meta-search engine device 130.

Figure 4:
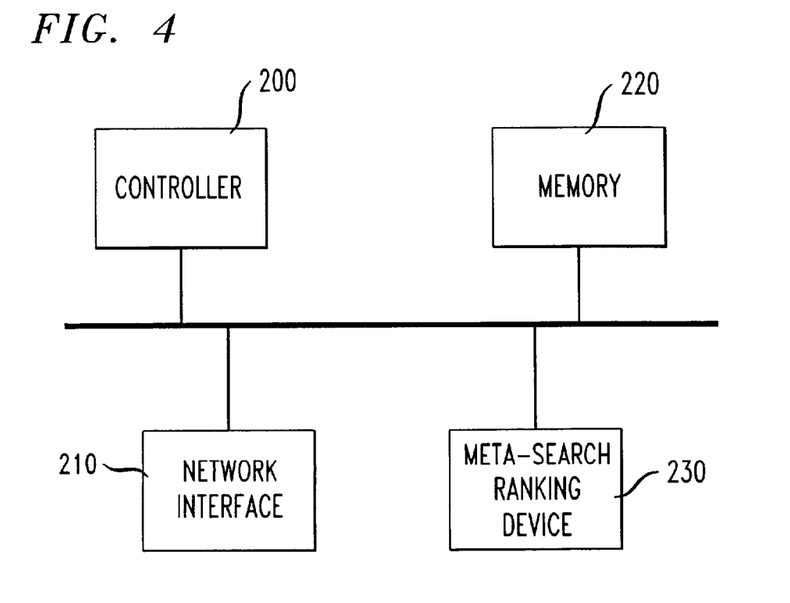
FIG. 4 is a block diagram of the meta-search engine of FIG. 3.

FIG. 4 is an exemplary block diagram of the meta-search engine device 130 of FIG. 3. The meta-search engine device 130 includes a controller 200, a network interface 210, a memory 220 and a meta-search ranking device 230. These devices 200–230 are in communication with one another via the control/signal bus 240. As described above, the meta-search engine device 130 may also include an association generator (not shown) which includes a plurality of terms and their associations for use when sending the search query to the search engine devices 140–160. For purposes of the following description, it will be assumed that the meta-search engine device 130 does not include the association generator and that related search terms are determined by the search engine devices 140–160 themselves.

When a user device 100 accesses the meta-search engine device 130 by, for example, entering a universal resource locator (URL), Internet protocol (IP) address, telephone number, or the like, into the user device 100, the controller 200 receives a communication signal from the user device 100 through the network interface 210. In response to receiving the communication signal, the controller 200 sends a message to the user device 100, through network interface 210, requesting that the user device 100 transmit a search query. In addition to the request, the controller 200 may also send advertisements and other information stored, for example, in memory 220, to the user device 100 as is generally known in the art.

The controller 200 then receives a reply from the user device 100 containing the search query. The controller 200 sends the search query to each of the plurality of search engine devices 140–160 through network interface 210. The controller 200 receives the search results from each of the plurality of search engine devices 140–160 and stores them in memory 220. The search results include a listing of the titles of sources having the search terms, or related search terms, of the entered query and a summary of each source. The meta-search ranking device 230 then merges and sorts the search results in memory 220 for the user's search query into a single ranked list based on one or more ranking criteria.

The titles and summaries are not limited to any particular format and may be any format readily apparent to one of ordinary skill in the art. For example, the titles and summaries may include flowing text, a listing of terms and the number of occurrences of the terms, and the like. The format of the titles and summaries should be mutually agreed upon by the developers of the plurality of search engine devices 140–160 and the meta-search engine device 130, but mutual agreement is not necessary to the functioning of this invention.

The primary ranking criteria is the occurrence of the search terms, or related search terms, in the titles and summaries of sources identified in the results obtained from the search engines. However, the ranking criteria may include, for example, rankings obtained from the search engine devices 140–160, weighting factors assigned to the various search engines 140–160, the number of search engine devices 140–160 that return the source as a result of the search query, weighting of various sections of the search results, the weights assigned to the search results by the search engine devices 140–160, and the like.

The resulting ranked list is then sent to the user device 100 via the network interface 210. In this way, the user of the user device 100 is provided with a single ranked list of sources of the entered search terms covering all or a large part of the network 120.

As described above, the primary ranking criteria is the occurrence of search terms, or related search terms in the title and summary of sources identified in the search results of the search engines 140–160. Based on, for example, the number of occurrences of the search terms, or related search terms, and their position within the title or summary, a score may be calculated by the meta-search ranking device 230 for the particular source. This score may be further weighted by factors such as the number of search engine devices 140–160 returning the source in their search results, the particular search engine device that returned the source in its search results, and the like. While scoring is the method of the preferred embodiments, other methods of ranking the search results based on the title and/or summary of the source may be used without departing from the spirit and scope of the present invention. Furthermore, while specific scoring techniques are described, other known or later developed scoring techniques based on the titles and/or summaries of the sources may be used without departing from the spirit and scope of the present invention.

Figure 5:
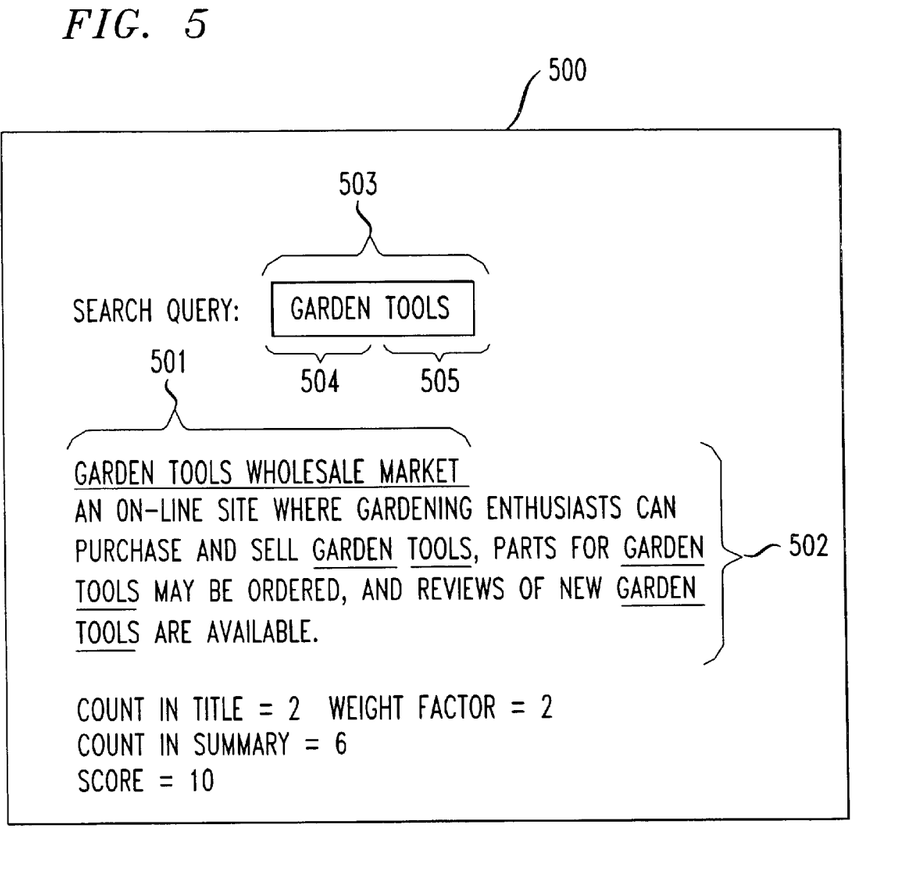
FIG. 5 is an example of scoring a source returned by a search engine.

FIG. 5 demonstrates an example of a possible scoring technique that may be used with the present invention to obtain a score for a particular source. As shown in FIG. 5, source 500 is returned by a search engine device 140–160 in response to a search query 503 containing search terms 504 and 505. The source 500 includes a title 501 and a summary 502.

In calculating a score for the source, the meta-search ranking device 230 counts the number of occurrences of search terms, or related search terms, within the title 501 and summary 502 of the source 500. The count may be weighted, for example, depending on whether the search term is found in the title 501 or the summary 502. For example, it may be determined that sources 500 having search terms, or related search terms, in their titles are generally more relevant to the search than sources not having the search terms in their titles. Thus, the count of search terms and related search terms in the title 501 may be weighted by a factor of 1.5, 2.0, and the like, depending on the relative significance placed on the titles of the sources. Similarly, if it is determined that sources having search terms, or related search terms, in their summaries are generally more relevant, weighting factors may be applied to the count of search terms and related search terms in the summaries.

As shown in FIG. 5, the particular ranking scheme chosen places a weighting factor of 2.0 on the count of search terms and related search terms in the title. Thus, in this example, the count of search terms and related search terms in the title is 4.0. The count of search terms and related search terms in the summary is 6.0 and thus the score for the source 500 is 10.0.

This score may be further modified by the number of search engine devices 140–160 returning the source as a result of the search query. Thus, if two search engine devices 140–160 return the source 500, the score may be weighted by a factor of 1.25, 1.50, or the like. Additionally, the score may be modified by weights assigned to particular search engine devices 140–160. Thus, if a first search engine device is assigned a weight of 1.5 and a second search engine device is assigned a weight of 2.0, then the second search engine device is determined to be of slightly greater importance than the first search engine. Thus, sources in the search results returned by the second search engine will have scores that reflect the relative importance of the second search engine by having their scores weighted.

Once a score is determined for each of the sources returned by the search engine devices 140–160, the sources are arranged in a list ranked by score. The list will generally be ranked from highest score to lowest score; however, any other ranking based on the above described scores may be used without departing from the spirit and scope of this invention. In this way, a single ranked list is returned to the user so that the user may quickly identify those sources of particular interest to the user.

If two or more sources have the same score, they may be ranked by secondary scores, such as based only on the score of search terms in the title or summary, and the like or they may be listed, for example, in alphabetical order or arbitrarily.

Figure 6:
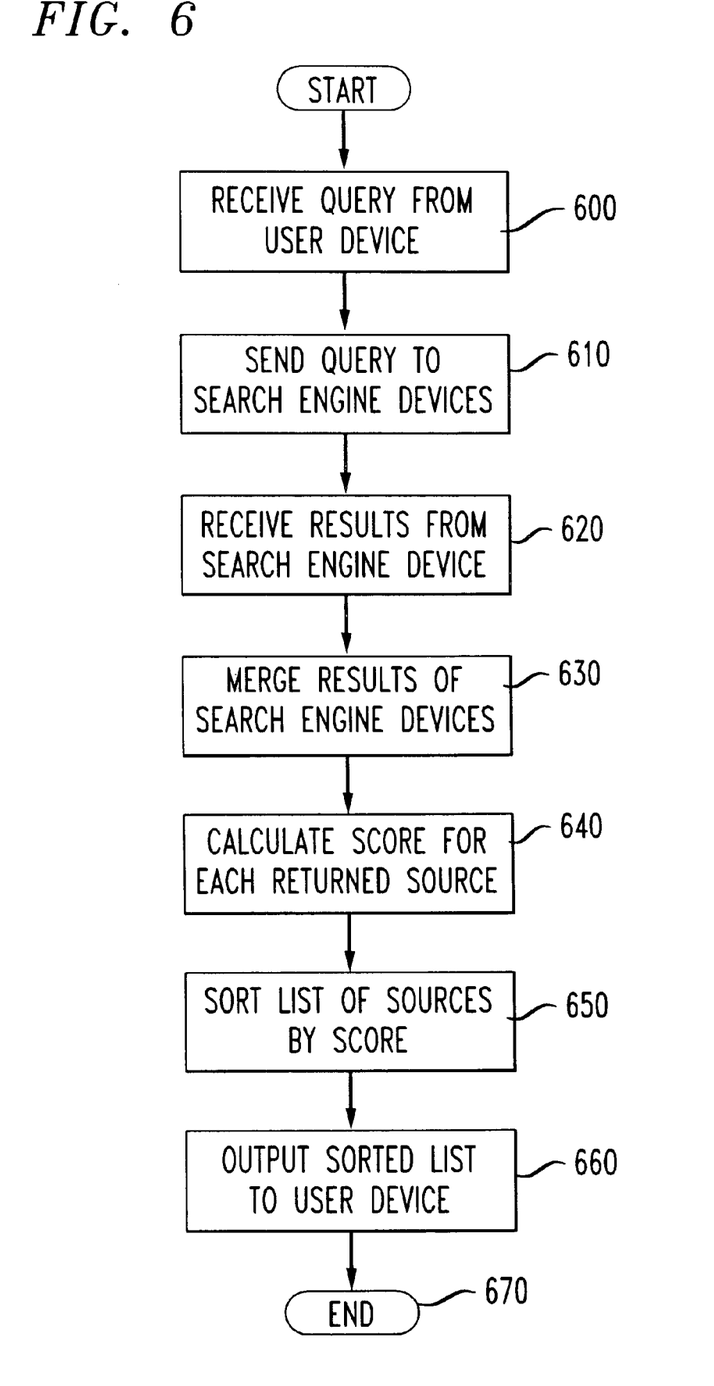
FIG. 6 is a flowchart outlining one exemplary process of the meta-search engine of FIG. 4.

FIG. 6 is a flowchart outlining an exemplary operation of the meta-search engine device 130. As shown in FIG. 6, in step 600, the controller 200 receives a query containing search terms from a user device, and goes to step 610. In step 610, the controller 200 sends the query search terms and/or related terms to each available search engine device 140–160, and goes to step 620. The query search terms and/or related terms may be formatted for the particular search engine device to which they are being input.

In step 620, the controller 200 receives the results of each of the search engine devices 140–160 and stores them in memory. In step 630, the controller 200 merges the results returned by each of the search engine devices 140–160 into a single list. This process may further include removing multiple listings of the same source while still keeping a count of how many and which search engine devices 140–160 returned the source in their results. Control then continues to step 640.

In step 640, the controller 200 calculates scores for each source in the merged listing, and goes to step 650. In step 650, the merged list is sorted by score so that a ranked merged list is obtained. In step 660, the controller 200 outputs the ranked merged list to the user device 100 for use by the user. Control then ends in step 670.

As an example of how the above meta-search engine device 130 operates, assume a user, Alan, enters a search query comprising the search terms "GARDEN TOOLS" into the meta-search engine device 130 via his user device 100 and network 120. The meta-search engine device 130 enters the search query terms and/or related terms into each of the search engine devices 140–160 and waits for the search engine devices 140–160 to return the results of each of their individual searches. Optionally, rather than waiting for the search engine devices 140–160 to return the results, the meta-search engine device 130 may wait for a predetermined period of time and report only the search results returned during the predetermined period of time.

Once the results are received from the search engine devices 140–160, the meta-search engine device 130 merges the results into a merged list and removes redundancies while maintaining a count and identification of how many and which of the search engine devices 140–160 returned each source in the merged list. Once the merged list is obtained, the meta-search engine device 130 calculates scores for each source based primarily on the occurrence of search terms and/or related terms in the title and summaries of the sources and sorts the merged list by score. The sorted list is then returned to Alan's user device 100 as a single ranked list.

Figure 7:
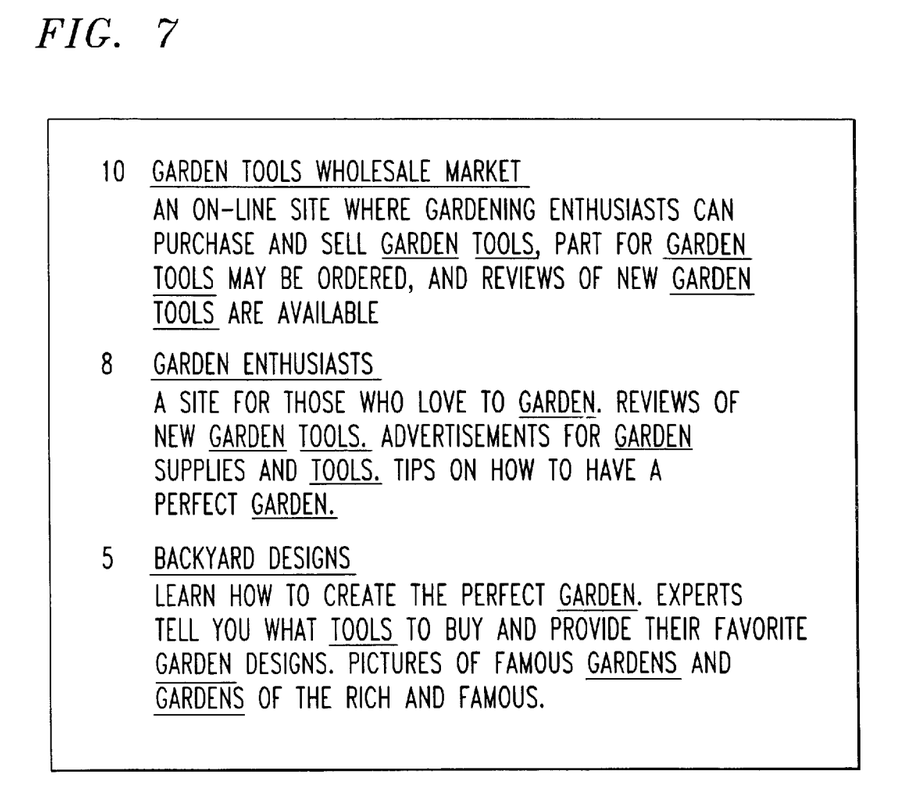
FIG. 7 is a diagram of an example ranked merged list.

FIG. 7 is an example of a ranked list returned in response to the search query "GARDEN TOOLS." As shown in FIG. 7, the source "GARDEN TOOLS WHOLESALE MARKET" is ranked number 1 with a score of 10, the source "GARDEN ENTHUSIAST" is ranked number 2 with a score of 8, and the source "BACKYARD DESIGNS" is ranked number 3 with a score of 5. Thus, the source "GARDEN TOOLS WHOLESALE MARKET" is determined by the meta-search engine device 130 to be the most relevant source for the search query.

While the above embodiment assumes that all search engine devices 140–160 are utilized when a search query is entered by the user, the user may also select which of the search engine devices 140–160 he/she wishes to use. Thus, the user is able to limit their search to particular portions of the network 120. For example, if the user wishes to only use search engine devices 140 and 150, only portions A and B of the network 120 will be searched. Likewise, if the user wishes to use search engine devices 140 and 160, only portions A and C will be searched.

As shown in FIG. 4, the method of this invention is preferably implemented on a programmed processor. However, the meta-search engine device 130 can also be implemented on a general purpose or special purpose computer, a programmed microprocessor or microcontroller and peripheral integrated circuit elements, an ASIC or other integrated circuit, a hardware electronic or logic circuit such as a discrete element circuit, a programmable logic device such as a PLD, PLA, FPGA or PAL, or the like. In general, any device on which a finite state machine capable of implementing the flowchart shown in FIG. 6 exists can be used to implement the meta-search engine device 130 functions of this invention.

While this invention has been described with specific embodiments thereof, it is evident that many alternatives, modifications, and variations will be apparent to those skilled in the art. Accordingly, the preferred embodiments of the invention as set forth herein are intended to be illustrative, not limiting. Various changes may be made without departing from the spirit and scope of the invention.

What is claimed is:

1. A method for searching a distributed network, comprising:

submitting a query simultaneously to a plurality of search engine devices, the query including at least one search term;

receiving search results from the search engine devices, the search results including listings of sources containing the at least one search term, or a term or terms related to the at least one search term, wherein the listings of sources include at least one of a title and summary of each source;

ranking the search results based on the occurrence of the at least one search term, or a term or terms related to the at least one search term, in at least one of titles and summaries of the search results; and compiling a single ranked list of the received search results, wherein the ranking step comprises generating scores for each source in the search results and sorting the search results into the single ranked list based on the generated scores, and if two or more sources have a same score, the ranking step further comprises calculating a secondary score for the two or more sources and the ranking of the two or more sources is based on the secondary score.

2. The method of claim 1, wherein the ranking is further based on at least one of rankings obtained from the search engine devices, weighting factors based on a particular search engine device from which the search results are retrieved, the number of repetitions of the search results, and weighting of sections of the search results obtained from the search engine devices.

3. The method of claim 1, further comprising sending the single ranked list to a user device.

4. The method of claim 1, wherein a score of a source is calculated by counting the number of occurrences of the at least one search term, or a term or terms related to the at least one search term, in the title and summary of the source.

5. The method of claim 4, further comprising multiplying at least one of a count of the number of occurrences of the at least one search term, or a term or terms related to the at least one search term, in the title and a count of the number of occurrences of the at least one search term, or a term or terms related to the at least one search term, in the summary by a weighting factor.

6. The method of claim 4, further comprising multiplying the score of a source by a weighting factor.

7. A searching apparatus for searching a distributed network, comprising:

a controller; and a ranking device, wherein the controller submits a query to a plurality of search engine devices, the query including at least one search term, and receives search results from the search engine devices simultaneously, and wherein the ranking device ranks the search results based on the occurrence of the at least one search term, or a term or terms related to the at least one search term, in at least one of titles and summaries of the search results, wherein the controller compiles a single ranked list of the received search results, the search results include listings of sources containing the at least one search term, or a term or terms related to the at least one search term, and wherein the listings of sources include at least one of a title and summary of each source, wherein the ranking device ranks the search results by generating scores for each source in the search results and sorting the search results into the single ranked list based on the generated scores; and wherein if two or more sources have a same score, the ranking device calculates a secondary score for the two or more sources and the ranking of the two or more sources is based on the secondary score.

8. The apparatus of claim 7, wherein the ranking is further based on at least one of rankings obtained from the search engine devices, weighting factors based on a particular search engine device from which the search results are retrieved, the number of repetitions of the search results, and weighting of sections of the search results obtained from the search engine devices.

9. The apparatus of claim 7, wherein the controller sends the single ranked list to a user device.

10. The apparatus of claim 7, wherein the ranking device calculates a score of a source by counting the number of occurrences of the at least one search term, or a term or terms related to the at least one search term, in the title and summary of the source.

11. The apparatus of claim 10, wherein the ranking multiplies at least one of a count of the number of occurrences of the at least one search term, or a term or terms related to the at least one search term, in the title and a count of the number of occurrences of the at least one search term, or a term or terms related to the at least one search term, in the summary by a weighting factor.

12. The apparatus of claim 10, wherein the ranking device multiplies the score of a source by a weighting factor.

13. A method for searching a distributed network, comprising:

submitting a query to a plurality of search engine devices, the query including at least one search term;

receiving search results from the search engine devices;

ranking the search results based on the occurrence of the at least one search term, or a term or terms related to the at least one search term, in titles and summaries of the search results, and on at least one of rankings obtained from the search engine devices, weighting factors based on a particular search engine device from which the search results are retrieved, the number of repetitions of the search results, and weighting of sections of the search results obtained from the search engine devices; and compiling a single ranked list of the received search results, the search results including listings of sources containing the at least one search term, or a term or terms related to the at least one search term, wherein the listings of sources include at least one of a title and a summary of each source; and wherein the ranking step comprises generating scores for each source in the search results and sorting the search results into the single ranked list based on the generated scores, and if two or more sources have a same score, the ranking step further comprises calculating a secondary score for the two or more sources and the ranking of the two or more sources is based on the secondary score.

14. A searching apparatus for searching a distributed network, comprising:

a controller; and a ranking device, wherein the controller submits a query to a plurality of search engine devices, the query including at least one search term, and receives search results from the search engine devices, wherein the ranking device ranks the search results based on the occurrence of the at least one search term, or a term or terms related to the at least one search term, in at least one of titles and summaries of the search results, and on at least one of rankings obtained from the search engine devices, weighting factors based on a particular search engine device from which the search results are retrieved, the number of repetitions of the search results, and weighting of sections of the search results obtained from the search engine devices, and wherein the controller compiles a single ranked list of the received search results, the search results include listings of sources containing the at least one search term, or a term or terms related to the at least one search term, and wherein the listings of sources include at least one of a title and a summary of each source;

wherein the ranking device ranks the search results by generating scores for each source in the search results and sorting the search results into the single ranked list based on the generated scores; and wherein if two or more sources have a same score, the ranking device calculates a secondary score for the two or more sources and the ranking of the two or more sources is based on the secondary score.

15. A method for searching a distributed network, comprising:

submitting a query to a plurality of search engine devices, the query including at least one search term;

receiving search results from the search engine devices; and ranking the search results based on weights assigned to at least one particular search engine device from which the search results are received, wherein if two or more sources listed in the search results have a same score, the ranking step further comprises calculating a secondary score for the two or more sources and the ranking of the two or more sources is based on the secondary score.

16. A searching apparatus for searching a distributed network, comprising:

a controller; and a ranking device, wherein the controller submits a query to a plurality of search engine devices, the query including at least one search term, and receives search results from the search engine devices, and wherein the ranking device ranks the search results based on weights assigned to at least one particular search engine device from which the search results are received, wherein if two or more sources listed in the search results have a same score, the ranking device calculates a secondary score for the two or more sources and the ranking of the two or more sources is based on the secondary score.

* * * * *